United States Patent [19]
Benedict

[11] Patent Number: 5,912,534
[45] Date of Patent: Jun. 15, 1999

[54] DOUBLE RELAY LIGHT SWITCHING SYSTEM FOR PROVIDING DAYTIME RUNNING LIGHTS FOR VEHICLES

[75] Inventor: Charles E. Benedict, Tallahassee, Fla.

[73] Assignee: Autosmart Light Switches, Inc., Tallahassee, Fla.

[21] Appl. No.: 08/819,042

[22] Filed: Mar. 17, 1997

Related U.S. Application Data

[XX .
[60] Provisional application No. 60/013,631, Mar. 18, 1996.
[51] Int. Cl.$^6$ ..................................................... H05B 37/02
[52] U.S. Cl. ................................ 315/82; 315/83; 307/10.8
[58] Field of Search .................................. 307/10.6, 10.7, 307/10.8; 315/76, 77, 82, 83

[56] References Cited

U.S. PATENT DOCUMENTS

| | | |
|---|---|---|
| 2,449,338 | 9/1948 | Summersett . |
| 3,348,095 | 10/1967 | Gold . |
| 3,385,998 | 5/1968 | Gold . |
| 3,414,763 | 12/1968 | Kibler . |
| 3,430,100 | 2/1969 | Dill, Jr. . |
| 3,764,816 | 10/1973 | Johnson . |
| 3,993,914 | 11/1976 | Conrad et al. . |
| 4,667,129 | 5/1987 | Papillon . |
| 4,684,819 | 8/1987 | Haag et al. . |
| 4,686,423 | 8/1987 | Eydt . |
| 4,831,310 | 5/1989 | Heintzberger et al. . |
| 4,841,199 | 6/1989 | Irie . |
| 4,862,036 | 8/1989 | Kriss, II . |
| 4,899,083 | 2/1990 | Kataoka et al. . |
| 4,956,562 | 9/1990 | Benedict et al. . |
| 5,136,209 | 8/1992 | Benedict et al. . |
| 5,185,558 | 2/1993 | Benedict et al. . |
| 5,614,788 | 3/1997 | Mullins et al. . |
| 5,666,028 | 9/1997 | Bechtel et al. ............................ 315/82 |

*Primary Examiner*—Don Wong
*Assistant Examiner*—David H. Vu
*Attorney, Agent, or Firm*—Dowell & Dowell, P.C.

[57] ABSTRACT

A double relay control circuit for connection between the ignition switch and starter switch of a vehicle and the vehicle power supply and exterior lights for providing automatic daytime running lights whenever the vehicle ignition switch is ON and the starter switch is OFF and subject to being overridden by the conventional light switches and ambient condition and vehicle condition sensors.

20 Claims, 3 Drawing Sheets

DOUBLE RELAY LIGHT SWITCHING SYSTEM FOR PROVIDING DAYTIME RUNNING LIGHTS FOR VEHICLES

CROSS REFERENCE TO RELATED APPLICATIONS

This application is related to provisional patent application Ser. No. 60/013,631 filed on Mar. 18, 1996. It is requested that the provisional file be merged with this application.

BACKGROUND OF THE INVENTION

1. Field of the Invention

This invention is generally directed to automatic circuits for providing automatic daytime running lights (DRL) for automotive vehicles and, more particularly, to a double relay switch system for providing DRL whenever a vehicle ignition switch is ON and a starter switch is OFF and dependent upon the condition of manual overrides, ambient condition sensors and vehicle condition sensors.

2. History of the Related Art

Automatic headlight and daytime running light (DRL) systems are known for use with automotive vehicles. Such systems are designed to provide illumination of vehicle headlights and, in some cases, parking or taillights and ICC trailer running lights for purposes of improving the manner in which a vehicle is made conspicuous in the daytime to thereby increase safety. Some existing systems provide for energizing the high beam filaments of the vehicle headlights at reduced power and others energize the lowbeam filaments of the headlights at normal power.

In addition to the foregoing, other systems have been designed for further controlling the operation of a vehicle exterior lighting system depending upon ambient conditions, such as ambient light levels and moisture conditions, to ensure that a vehicle's headlights, parking or taillights and running lights are fully illuminated in the event ambient conditions warrant such illumination during daylight hours.

Also, to reduce the drain on a vehicle battery, other systems have been designed for controlling the illumination of a vehicle exterior lighting system depending upon the condition of the vehicle's ignition and starter switches. In most such systems, the vehicle circuit includes a manual switch for activating the vehicle exterior lighting system with such protective circuits only being activated or useful in the event the manual switch is in the ON condition.

Some examples of prior art daytime running light systems are disclosed in U.S. Pat. Nos. 4,684,819 to Haag et al., 4,899,083 to Kataoka, 4,686,423 to Eydt, 4,831,310 to Heintzberger et al., and 4,667,129 to Papillons et al. Systems for preventing a drain on a battery system during starting are disclosed in U.S. Pat. Nos. 3,764,816 to Johnson, 2,449,338 to Summersett, 3,993,914 to Conrad et al., 3,348,095 to Gold, 3,385,998 to Gold, 3,430,100 to Dill, 3,414,763 to Kibler and 4,862,036 to Kriss.

Systems which are associated with daylight running light systems and which incorporate ambient condition light control circuits are disclosed in U.S. Pat. No. 4,956,562, 5,136,209, 5,185,558 and 5,614,788, all of which are assigned to the same Assignee as the present application.

SUMMARY OF THE INVENTION

The present invention is directed to a double relay circuit for providing an automatic daytime running light (DRL) system for vehicles which includes at least one first or primary normally open relay positioned between the vehicle power supply and the vehicle ignition and starter switches so as to control power to either the vehicle headlights and/or taillights and ICC running lights whenever the ignition is in an ON condition and the starter switch is in an OFF condition subject to override controls relating to manual switches and ambient condition and automotive condition sensors which automatically extinguish the DRL circuit. The primary relay has an input connected to the ignition switch and is connected to ground through a secondary relay which has an input connected to the starter switch, whereby when the starter switch is activated, the secondary relay opens to ground and that the primary relay switch is also open to ground, thereby preventing operation of the DRL system and extinguishing power through the at least one primary relay. In some embodiments, a time delay switch may be provided either between the vehicle power supply or the ignition switch and the primary relay(s) so that the primary relay(s) cannot function until a predetermined time after the ignition switch is turned to an ON condition.

With the present invention, if a conventional light switch is activated, the double relay control system is deactivated so that full power may be applied through the vehicle dimmer switch to the headlights, parking, tail and running lights. Further, the double relay system is disclosed in combination with various ambient condition sensors such as moisture sensors and light sensors which are operative to override and deactivate the double relay control system in the event ambient conditions are sensed. Further, the double relay control system is interfaced with vehicle condition sensors which monitor such things as the transmission to determine if the transmission is in "PARK" or to sense the position of the emergency brake, whereby if the emergency brake is applied or if the vehicle transmission is in "PARK," the double relay control system is deactivated to prevent power from being supplied therethrough to the exterior lighting system of the vehicle.

In accordance with one embodiment of the invention, the primary relay includes a pair of moveable contacts, each being connected to an output to one of either of the vehicle headlights or the vehicle parking, tail or ICC running lights. Upon activation of the ignition switch and with the starter switch being OFF, power is supplied through the separate contacts to the vehicle headlights and the vehicle parking, tail and ICC running lights.

In accordance with another embodiment of the present invention, a pair of primary relays are connected between the power supply and the exterior vehicle lights with one having an output to the vehicle headlights and the other having an output to the vehicle parking, tail and/or ICC running lights. The first and second primary relays are interconnected with one another to the common ground established by the secondary relay.

It is the primary purpose of the present invention to provide a double relay system for controlling the operation of vehicle headlights and tail, parking and running lights to ensure that power is supplied to illuminate the lights whenever the vehicle ignition is ON and the starter motor actuating switch is OFF.

It is a further object of the invention to provide a system which may be incorporated with a daytime running light system for supplying power to the vehicle headlights and other exterior lights and especially reduced power to the headlights only or the headlights together with the taillights, parking lights and running lights whenever the ignition switch is ON and the starter switch is OFF and the manual light switch not activated. Under these conditions, lights are illuminated, preferably at reduced levels, during daylight hours.

It is a further object of the present invention to provide a double relay control system for providing daytime running lights for vehicles which interface with ambient condition sensors and vehicle condition sensors which override the double relay control circuit in the event certain ambient conditions or certain vehicle conditions are sensed.

It is a further object of the present invention to provide a relay control circuit for providing daytime running lights which may operate independently of a conventional vehicle lighting switch, but which can be overridden upon the activation of the conventional light switch.

BRIEF DESCRIPTION OF THE DRAWINGS

The invention will be better understood with reference to the drawings wherein.

DESCRIPTION OF THE PREFERRED EMBODIMENT

Figure 1:
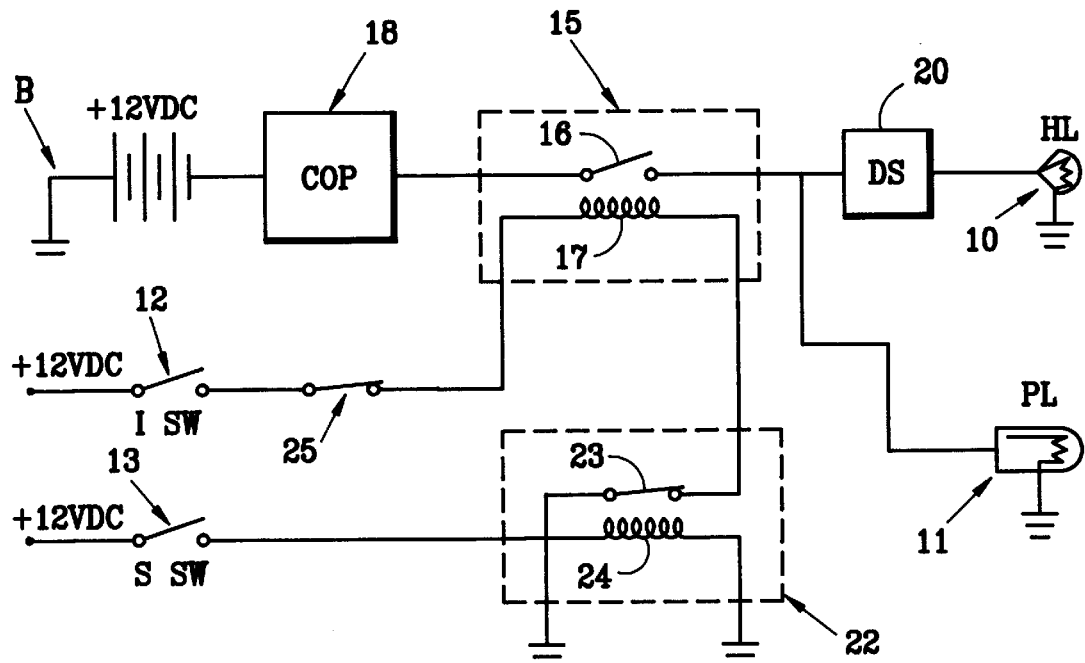
FIG. 1 is a simplified circuit diagram illustrating the double relay control system of the present invention.

With specific reference to FIG. 1, the double relay control circuits of the present invention are designed to supply power to the vehicle headlights 10, parking, tail or running lights 11, whenever the ignition switch 12 is in the ON position and the starter switch is in the OFF position. A first or primary normally open relay 15 consists of a movable contact 16 and coil 17. The movable contact is connected to the vehicle 12 volt DC power supply or battery "B" through a current overload protector (COP) 18 which may be a fuse, thermally activated switch or contacts, or any other conventional overload protector. As shown in the circuitry of FIG. 1, when the ignition switch 12 is closed to an ON position thereby providing current to the coil 17 of relay 15, the movable contact 16 is closed thereby supplying current directly to the parking, tail and running lights 11 and through the vehicle's dimmer switch (DS) 20 to the vehicle headlights 10.

The first or primary relay 15 is connected through a second normally closed relay 22 to ground. Therefore, whenever the relay 22 is open, power through the primary relay is automatically terminated. Relay 22 includes a normally closed movable contact 23 which is urged into an open position upon activation of a related relay coil 24 which receives power through the starter switch 13 when the starter switch is in a closed position to activate the starter motor. Thus, whenever the starter motor is being activated, power to the vehicle headlights and parking or taillights is automatically terminated by opening the ground contact to the primary relay 15. The double relay, therefore, prevents excess drain on the vehicle battery power supply by assuring that power to the lighting system is not supplied during the starting procedure.

An optional normally closed manual by-pass or cut-off switch 25 may be included and placed between the ignition switch and the coil 17 of the first relay 15 to manually turn OFF the lights. This feature is particular advantageous for military uses or utility uses when the engine must be operated without the lights being on. Therefore, by opening the manual switch 25, even though the ignition switch is ON, the lighting system is de-energized.

Figure 2:
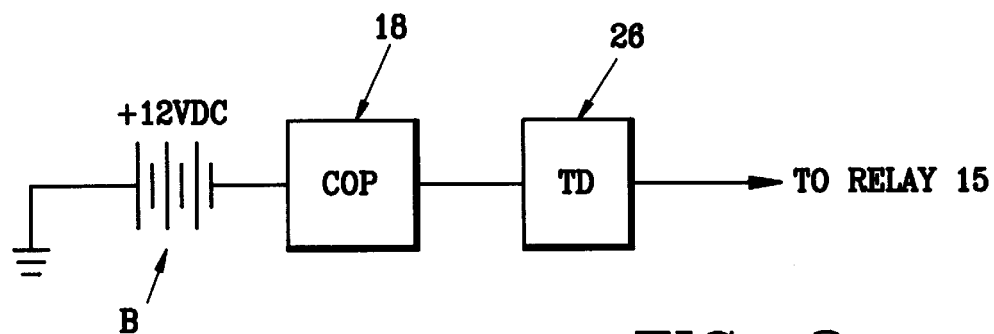
FIG. 2 is a modification to the circuit diagram to FIG. 1 incorporating a time delay in the control circuit.
Figure 3:
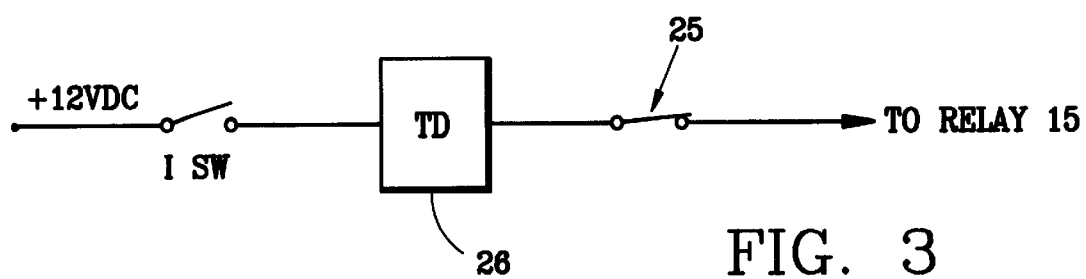
FIG. 3 is a further modification of the circuit of FIG. 1 showing a time delay in another portion of the control circuit.

With reference to FIGS. 2 and 3, modifications to the primary circuit of FIG. 1 are shown. In these embodiments, a time delay ON/OFF switch 26 is provided between the current overload protector and the movable contact of the first relay 15. The time delay ON/OFF is designed to maintain the lights OFF until the engine is running. The time delay switch can be placed between the power supply and the lights, as is shown in FIG. 2, or may be placed between the ignition switch 12 and the coil 17 of the first relay, as is shown in FIG. 3. In actual practice, the time delay switch can be placed anywhere in the first relay coil circuit. The time delay can also control the OFF time after the ignition switch is de-activated so that power is only supplied to the exterior vehicle lights for a predetermined period after the ignition is OFF.

Figure 4:
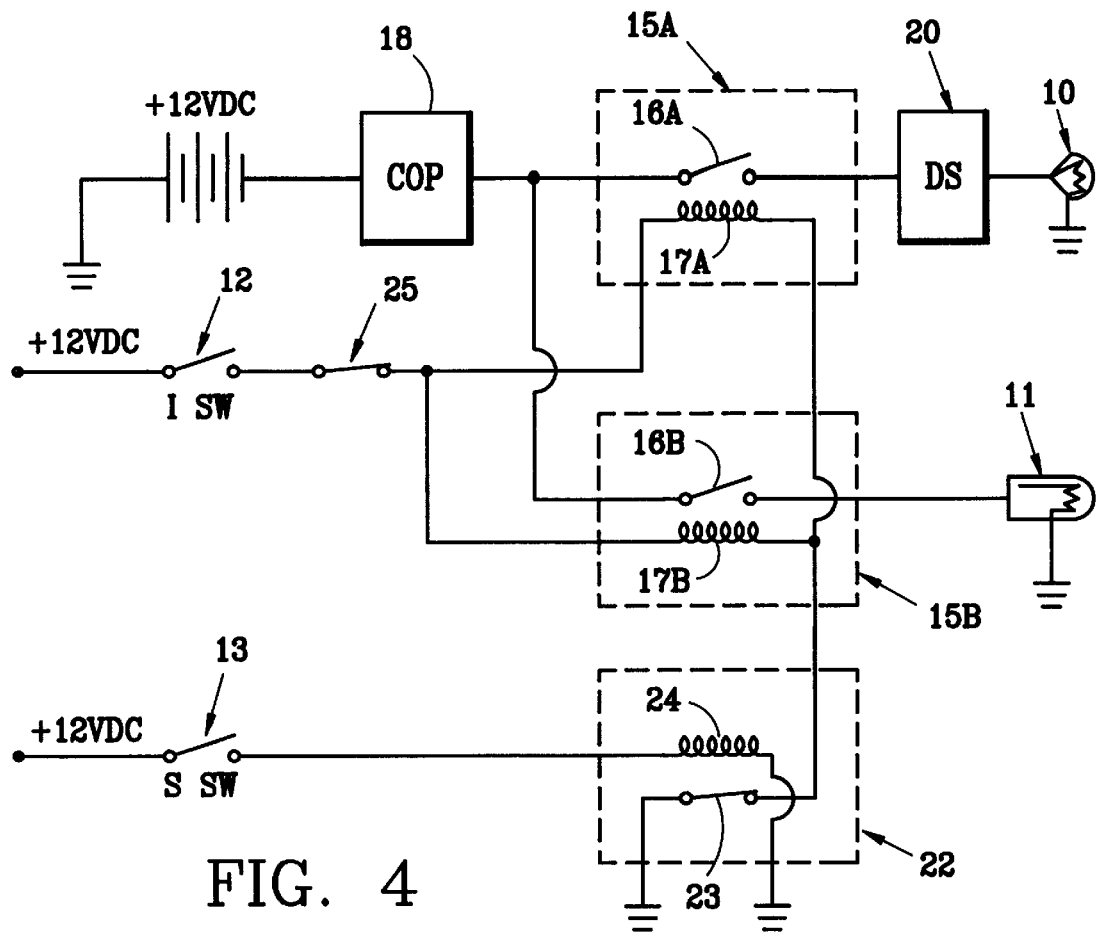
FIG. 4 is a circuit diagram illustrating the double relay control system of the present invention utilizing a two position switch relay in a relay circuit similar to FIG. 1.

With particular reference to FIG. 4, a modification of the circuitry of FIGS. 1–3 is disclosed wherein separate primary relays are provided for controlling the operation of the headlights 10 and tail, parking or running lights 11. In this embodiment, the first primary relay 15 of FIG. 1 has been replaced by a pair of relays 15A and 15B each of which is normally open and includes a movable contact 16A, 16B which is activated by a coil 17A, 17B. Both of the movable contacts 16A and 16B are connected through the current overload protector 18 to the vehicle power supply and movable contact 16A is also connected through the vehicle dimmer switch 20 to the vehicle headlights 10. The movable contact 16B is connected directly to the vehicle parking, tail or running lights 11. Coils 17A and 17B are connected to the ignition switch 12 through an optional manual override switch 25 so that coil 17A and 17B are activated whenever the ignition switch is ON and the manual switched is closed. Both of the coils 17A and 17B are connected to ground through a normally closed movable contact 23 of relay 22. Secondary relay 22 also includes an activation coil 24 connected to the vehicles starter switch 13. Therefore, whenever the starter switch is in a closed or ON position to activate the starter motor, power to the coils 17A and 17B will be terminated as the movable contact 23 will be open thereby disconnecting the coils 17A and 17B from ground and terminating power to the headlights and other exterior lights. The same time delays disclosed in FIGS. 2 and 3 may also be utilized with the circuitry of FIG. 4.

Figure 5:
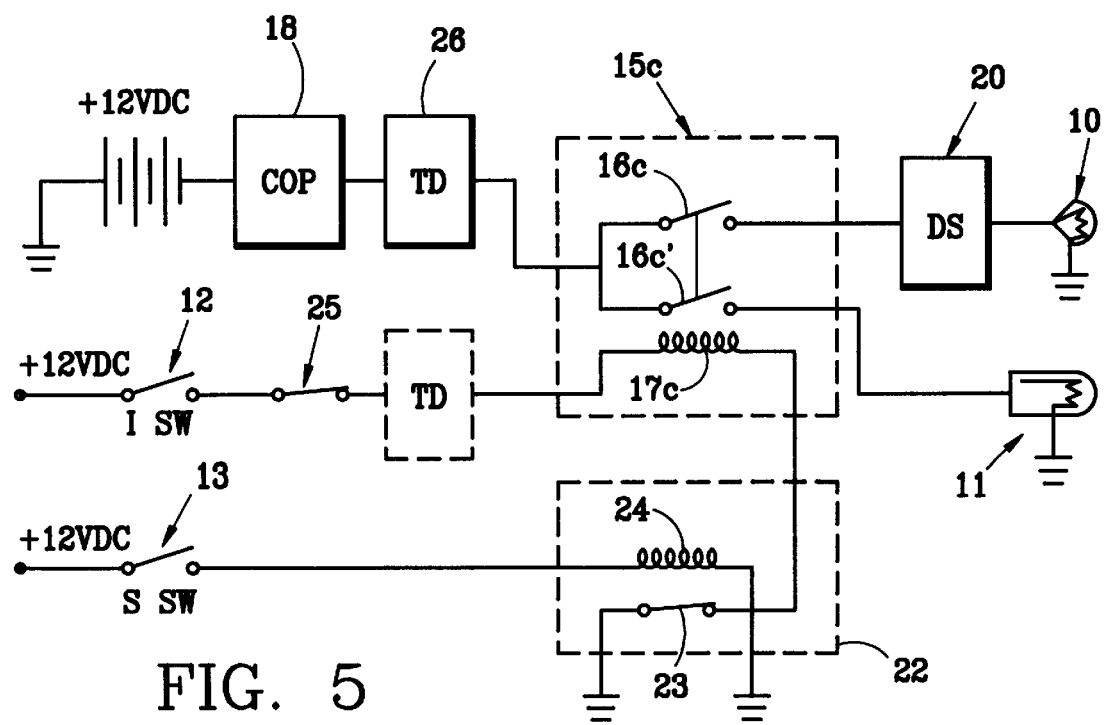
FIG. 5 is a further modification of the circuit of FIG. 1 incorporating a DPST relay for simultaneously controlling the operation of the headlights and parking lights.

A further embodiment to the control circuitry of FIG. 1 is shown in FIG. 5 wherein the primary relay 15 has been replaced by a double pole relay switch 15C including interconnected movable contacts 16C and 16C' which are simultaneously activated by coil 17C which is connected to the vehicle ignition switch 12 through an optional normally closed manual override switch 25. Movable contact 16C is connected through the vehicle dimmer switch 20 to the headlights 10 whereas movable contact 16C' is connected directly to the vehicle taillights, parking lights and clearance or running lights 11. The movable contacts 16C and 16C' are connected through a current overload protector 18 to the vehicle power supply and may be connected through a time delay 26, as previously described. Relay coil 17C is connected to ground through the normally closed movable contact 23 of the secondary relay 22. Coil 24 is connected to the vehicle starter switch 13 so that whenever the starter switch is activated the normally closed contact 23 will be open thereby extinguishing power to the coil 17C of relay 15C and extinguishing power to the vehicle lights 10 and 11. The time delay 26 may optionally be placed in the circuit between the ignition switch and the coil 17C.

Figure 6:
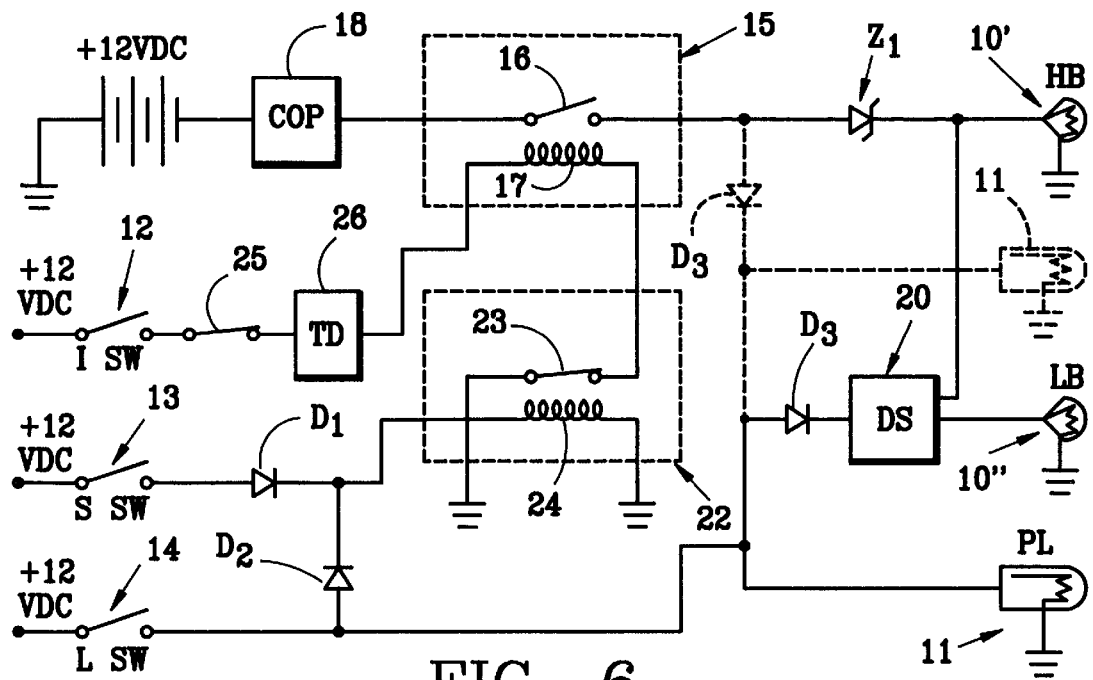
FIG. 6 is a circuit diagram incorporating the control system of FIG. 1 in a daytime running light (DRL) circuit.

In FIG. 6, the double relay control system of the present invention is shown in a circuit to supply power at a reduced level to the high beam filaments 10' whenever the ignition switch 12 is ON and the starter switch 13 is OFF or open. In such a system, it is necessary to be able to override the daytime running light (DRL) operation whenever the conventional vehicle light switch 14 is activated to provide full power to the vehicle headlights and taillights. Power at a reduced level is applied in the DRL circuit to the high beam filaments 10' by connecting the filaments to the vehicle power supply through a primary relay 15. Movable contact 16 which is normally open is connected through a current overload protector 18 to the vehicle power supply and is also connected through a Zener diode Z1 to the high beam filament 10'. The Zener diode functions to reduce the power to an appropriate level so as to illuminate the high beam filaments at a reduced level and thereby prolong the life of the high beam filament. Movable contact 16 of relay 15 is closed by activation of coil 17 which is connected to the vehicle ignition switch 12. An optional manual override switch 25 and time delay switch 26 may be provided as previously discussed to further control power through the primary relay 15. Coil 17 is connected to ground through normally closed contact 23 of relay 22. Normally closed contact 23 is open by activation of coil 24 whenever the vehicle starter switch 13 is activated to provide power to the starter motor. This automatically ensures that all power to the vehicle headlights and taillights is terminated at relay 15 whenever the starter motor is engaged. Relay 15 is further connected through the vehicle dimmer switch 20 to the low beam filaments 10" and may optionally be connected to activate the vehicle parking, tail or running lights 11, as shown in dotted line in FIG. 6, wherever the coil 17 is activated.

It should be noted that as opposed to powering the high beam filaments 10' of the vehicle headlights at reduced power, the low beam filaments may be powered at either a reduced power level or full power level. The relays would function in the same manner as described for regulating power to the high beam filaments in a DRL mode.

The conventional vehicle light switch 14 is connected directly to the vehicle parking, tail or running lights 11 and through a diode D3 to the vehicle dimmer switch 20 and from there to the vehicle headlights 10' and 10". It is necessary to override the DRL power supply to the high beam filament 10', or power to the low beam filament, in a DRL mode, in the event the conventional light switch 14 is activated. To accomplish this, whenever the manual light switch is ON, voltage is applied to the coil 24 of relay 22 opening the movable contact 23 to thereby terminate power to the coil 17 of relay 15. By de-energizing the coil 17 of relay 15, the relay is open thereby turning OFF the high beam headlights at reduced power through Zener diode Z1. Under this condition, optional or alternative power to the tail, parking and running lights, and/or the low beam headlight filaments, as shown in dotted line in FIG. 6, is also extinguished through relay 15 and power is applied directly through the vehicle light switch 14 to the exterior vehicle lights including headlights and taillights. A diode D1 is placed between the starter switch 13 and the junction of the circuit from the light switch 14 to the coil 24 of relay 22 so that the light switch activation does not activate the starter. Diode D2 is placed between the light switch circuit and the junction of the light switch circuit to the starter motor switch 13 so that when the starter switch is activated the normal manual light switch is not activated. The diode D3 is placed ahead of the input side of the dimmer switch 20 to prevent back feed voltage from the high beam headlights, during the DRL operation, into the light switch circuit to thus preventing the high beam DRL activation from activating relay 22 and causing the lights to flash ON and OFF.

As previously discussed, the time delay 26 may be placed in the circuit between the ignition switch 12 and the coil 17 of relay 15 to delay the activation of relay 15 until the starter switch is activated. This will prevent the lights from coming ON until after the starter switch has been released. The manual override switch 25 may be placed between the ignition switch 12 and the coil 17 of relay 15 to manually extinguish power to the lights at a time when it is necessary to allow continued vehicle operation without lights. It should be noted that the relay configurations shown in FIGS. 4 and 5 may also be used.

Figure 7:
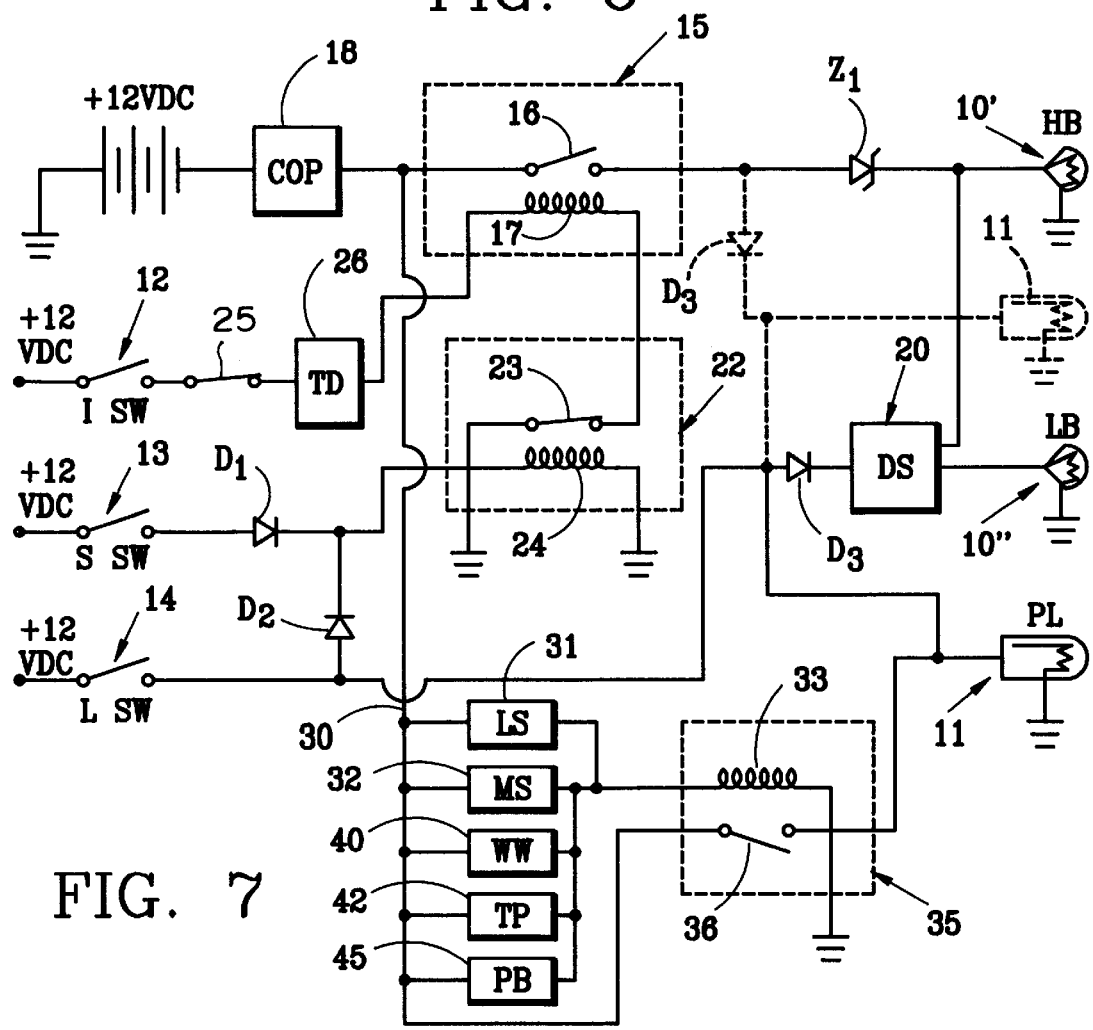
FIG. 7 is the control circuit of FIG. 1 incorporated with both a daytime running light (DRL) system and an ambient condition sensing system.

With reference to FIG. 7, the double relay control circuitry of the present invention is shown in further combination with sensors for controlling the activation of the exterior vehicle lights including headlights and taillights depending upon various ambient conditions, such as the presence of moisture or the reduction of light levels. In this embodiment, the control of the headlights during the DRL operation of the system is the same as described with respect to FIGS. 6 with the optional control of the taillights in the DRL mode being shown in dotted line in the drawing figure. Again, the double relay configurations of FIGS. 4 and 5 may also be used.

A power take off circuit line 30 is connected between the current overload protector 18 and the input to the movable contact 16 of relay 15. Line 30 is connected to a light sensor (LS) 31 and a moisture sensor (MS) 32 the outputs of which are connected to a coil 33 of a third relay 35. Relay 35 includes a normally open movable contact 36 which is moved to a closed position upon the activation of either the light sensor 31 or moisture sensor 32 determining a low light level or the presence of moisture. When one of the sensors is activated, coil 33 is activated thereby closing the contact 36 and providing power from the power supply directly to the vehicle parking lights, taillights and running lights 11 and to the vehicle headlights 10' and 10" through diode D3 and the dimmer switch 20. The output of switch 35 is also shown as being connected through diode D2 to the coil 24 of relay 22. Therefore, whenever the power is being supplied to the dimmer switch 20 and to the parking, tail or running lights 11 by activation of the relay 35, relay 22 will be caused to open thereby terminating power to coil 17 of relay 15 and thus de-activating the power supply through Zener diode Z1 in the DRL mode to the vehicle headlights and optional parking lights 11.

As opposed to monitoring moisture by way of a moisture sensor (MS) 32, or in addition thereto, a separate automotive condition sensor may be provided for monitoring activation of the vehicle windshield wiper circuit 40 (WW), as shown in dotted line in FIG. 7. Whenever the windshield wiper motor(s) is activated, power will be supplied to coil 33 of relay 35 thereby closing contact 36 and extinguishing the DRL mode of light power supply.

The relay control circuit of the present invention may also be utilized in combination with control sensors for monitoring other specific conditions of the vehicle so that power in the DRL mode is prevented even when the ignition switch 12 is ON and the starter motor switch 13 is OFF. In some instances, automatic illumination of the vehicle exterior lights may not be desired, such as when the vehicle is parked or when the emergency brake is applied. A sensor (TP) 42 may be associated with the vehicle transmission which is operable to supply current to coil 23 of relay 35 when the transmission is placed in "PARK." A sensed position of the transmission lever or control will therefore override the DRL operation of the lighting system. Likewise, a sensor (PB) 45 may be incorporated with the vehicle parking brake to provide power to the coil 33 of relay 35 whenever the parking brake is engaged to thereby override the DRL operation of the lighting system.

The following truth table shows the possible operative combinations of the relay control circuit of the present invention when incorporated with the DRL, ambient condition sensor (ACS) and vehicle condition sensors (VCS). The number "1" indicating an ON condition and "0" an OFF condition.

A Truth Table, Table I, of the embodiment shown in FIG. 7 of the inputs—ignition switch 12, starter switch 13, light switch 14, any one or both ambient condition sensors (ACS) 31, 32, and any one or more vehicle condition sensors (VCS) 40, 42, 45—and outputs —DRL (HB only, LB only, HB and PL, HB and PL) HL, and PL (normal through the conventional headlight switch)—of the present invention.

TABLE I

|         | 8 INPUTS | | | | | | | | 3 OUTPUTS | | | | | | | |
|---------|---|---|---|---|---|---|---|---|---|---|---|---|---|---|---|---|
| IGN (12) | 1 | 1 | 1 | 1 | 1 | 1 | 1 | 1 | 1 | 1 | 1 | 1 | 1 | 1 | 1 | 1 |
| ST (13)  | 1 | 0 | 0 | 0 | 0 | 0 | 0 | 0 | 1 | 1 | 1 | 1 | 1 | 1 | 1 | 1 |
| LS (14)  | 0 | 0 | 1 | 1 | 1 | 1 | 0 | 0 | 0 | 1 | 1 | 1 | 1 | 0 | 0 | 0 |
| ALS      | 0 | 0 | 0 | 1 | 1 | 0 | 1 | 1 | 0 | 0 | 1 | 1 | 0 | 1 | 1 | 0 |
| VCS      | 0 | 0 | 0 | 0 | 1 | 1 | 1 | 0 | 1 | 0 | 0 | 1 | 1 | 1 | 0 | 1 |
| DRL      | 0 | 1* | 0 | 0 | 0 | 0 | 0 | 0 | 0 | 0 | 0 | 0 | 0 | 0 | 0 | 0 |
| HL       | 0 | 0 | 1 | 1 | 1 | 1 | 1 | 1 | 1 | 0 | 0 | 0 | 0 | 0 | 0 | 0 |
| PL       | 0 | 0 | 1 | 1 | 1 | 1 | 1 | 1 | 1 | 0 | 0 | 0 | 0 | 0 | 0 | 0 |

*Note: DRL will go to "0" if auxiliary manual cutoff switch 25 is open between the ignition switch and the relay control circuit.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

What is claimed is:

1. A relay switching system for providing daytime running lights for vehicles having an exterior lighting system including headlights, tail or parking lights, a power supply, an ignition switch and a starter motor switch, the switching system comprising:

at least one primary relay connected between the vehicle power supply and at least the headlights of the exterior lighting system, said at least one primary relay having an input connected to the ignition switch so as to receive power from the ignition switch to close a normally open contact of said at least one primary relay in response to the ignition switch being in an ON condition, said at least one primary relay having a ground connection through a secondary relay having an input connected to the starter switch whereby when the starter switch is closed, the secondary relay is open to ground thereby extinguishing power through said at least one primary relay to the exterior lighting system whereby said at least one primary relay provides power from the power supply to at least the headlights of the exterior lighting system when the ignition switch is ON and the starter switch is OFF.

2. The relay switching system of claim 1 including a time delay means mounted between the power supply and said at least one primary relay.

3. The relay switching system of claim 1 including a time delay means mounted between the ignition switch and the input to said at least one primary relay.

4. The relay switching system of claim 1 including first and second primary relays, each being connected between the power supply and the exterior lighting system with said first primary relay being connected to the headlights and the second primary relay being connected to the tail or parking lights, each of said first and second primary relays having inputs connected to the ignition switch and having ground connections connected to said secondary relay whereby when said secondary relay receives power from the starter switch, said first and second primary relays become open to ground thereby extinguishing power to the vehicle headlights and tail or parking lights.

5. The relay switching system of claim 4 including a time delay circuit mounted between the ignition switch and said first and second primary relays.

6. The relay switching system of claim 1 in which said at least one primary relay includes a pair of moveable contact elements, one of said contact elements being connected with an output to the vehicle headlights and the other being connected to the vehicle tail or parking lights, each of said moveable contacts being operable to supply power to their respective outputs when the ignition switch is in an ON condition and the starter switch is in an OFF condition.

7. The relay switching system of claim 6 including a time delay switch mounted between said ignition switch and the input to said at least one primary relay.

8. The relay switching system of claim 1 including a manual light switch, circuit means for connecting said manual light switch to the input of said secondary relay whereby said manual light switch is open to ground when the starter switch is in a closed position, said output from said at least one primary relay being connected through a vehicle dimmer switch to at least the vehicle headlights of the exterior lighting system and said manual light switch being connected to at least the vehicle headlights through the vehicle dimmer switch whereby when the manual switch is in a closed position and the vehicle starter switch is open and the vehicle ignition switch is ON, power will be extinguished through an output from said at least one primary relay to the exterior vehicle lights with power being provided through the vehicle dimmer switch from the power supply.

9. The relay switching system of claim 8 including first and second primary relays, each being connected between the power supply and the exterior lighting system with said first primary relay being connected to the headlights and the second primary relay being connected to the tail or parking lights, each of said first and second primary relays having inputs connected to the ignition switch and having ground connections connected to said secondary relay whereby when said secondary relay receives power from the starter switch, said first and second primary relays become open to ground thereby extinguishing power to the vehicle headlights and tail or parking lights.

10. The relay switching system of claim 8 in which said at least one primary relay includes a pair of moveable contact elements, one of said contact elements being connected with an output to the vehicle headlights and the other being connected to the vehicle tail or parking lights, each of said moveable contacts being operable to supply power to their respective outputs when the ignition switch is in an ON condition and the starter switch is in an OFF condition.

11. The relay switching system of claim 8 including at least one ambient condition sensor mounted between the power supply and the vehicle dimmer switch, a third relay connected between said at least one ambient condition sensor and the vehicle dimmer switch, said third relay being operable when receiving an input from said at least one ambient condition sensor to supply power from the power supply through said third relay to the vehicle dimmer switch to thereby extinguish power through said at least one primary relay to the vehicle exterior lights.

12. The relay switching system of claim 11 including first and second primary relays, each being connected between the power supply and the exterior lighting system with said first primary relay being connected to the headlights and the second primary relay being connected to the tail or parking lights, each of said first and second primary relays having inputs connected to the ignition switch, and having ground connections connected to said secondary relay whereby when said secondary relay receives power from the starter switch, said first and second primary relays become open to ground thereby extinguishing power to the vehicle headlights and tail or parking lights.

13. The relay switching system of claim 11 in which said at least one primary relay includes a pair of moveable contact elements, one of said contact elements being connected with an output to the vehicle headlights and the other being connected to the vehicle tail or parking lights, each of said moveable contacts being operable to supply power to their respective outputs when the ignition switch is in an ON condition and the starter switch is in an OFF condition.

14. The relay switching system of claim 11 including a plurality of ambient condition sensors having outputs connected to said third relay.

15. The relay switching system of claim 11 including at least one vehicle condition sensor mounted between the power supply and said third relay, said third relay being operable when receiving an input from said at least one vehicle condition sensor to supply power through said third relay to the vehicle dimmer switch to thereby extinguish power through said at least one primary relay to the vehicle exterior lights.

16. The relay switching system of claim 15 including a plurality of vehicle condition sensors and a plurality of ambient condition sensors having outputs connected to said third relay.

17. The relay switching system of claim 16 operable in accordance with the following Truth Table:

| Truth Table: | | | | | | | | | | | | | | | | |
|---|---|---|---|---|---|---|---|---|---|---|---|---|---|---|---|---|
| | 8 INPUTS | | | | | | | | | 3 OUTPUTS | | | | | | |
| IGN (12) | 1 | 1 | 1 | 1 | 1 | 1 | 1 | 1 | 1 | 1 | 1 | 1 | 1 | 1 | 1 | 1 |
| ST (13)  | 1 | 0 | 0 | 0 | 0 | 0 | 0 | 0 | 0 | 1 | 1 | 1 | 1 | 1 | 1 | 1 |
| LS (14)  | 0 | 0 | 1 | 1 | 1 | 1 | 0 | 0 | 0 | 1 | 1 | 1 | 1 | 0 | 0 | 0 |
| ALS      | 0 | 0 | 0 | 1 | 1 | 0 | 1 | 1 | 0 | 0 | 1 | 1 | 0 | 1 | 1 | 0 |
| VCS      | 0 | 0 | 0 | 0 | 1 | 1 | 1 | 0 | 1 | 0 | 0 | 1 | 1 | 1 | 0 | 1 |
| DRL      | 0 | 1* | 0 | 0 | 0 | 0 | 0 | 0 | 0 | 0 | 0 | 0 | 0 | 0 | 0 | 0 |
| HL       | 0 | 0 | 1 | 1 | 1 | 1 | 1 | 1 | 1 | 0 | 0 | 0 | 0 | 0 | 0 | 0 |
| PL       | 0 | 0 | 1 | 1 | 1 | 1 | 1 | 1 | 1 | 0 | 0 | 0 | 0 | 0 | 0 | 0 | and wherein DRL 0 when an auxiliary manual cutoff switch is open between said ignition switch and a relay control circuit.

18. The relay switching system of claim 1 including at least one vehicle condition sensor mounted between the power supply and the vehicle dimmer switch, a third relay mounted between said at least one vehicle sensor and the vehicle dimmer switch, said third relay being operable when receiving an input from said at least one vehicle condition sensor to supply power through said third relay to the vehicle dimmer switch to thereby extinguish power through said at least one primary relay to the vehicle exterior lights.

19. The relay switching system of claim 18 including first and second primary relays, each being connected between the power supply and the exterior lighting system with said first primary relay being connected to the headlights and the second primary relay being connected to the tail or parking lights, each of said first and second primary relays having inputs connected to the ignition switch and having ground connections connected to said secondary relay whereby when said secondary relay receives power from the starter switch, said first and second primary relays become open to ground thereby extinguishing power to the vehicle headlights and tail or parking lights.

20. The relay switching system of claim 18 in which said at least one primary relay includes a pair of moveable contact elements, one of said contact elements being connected with an output to the vehicle headlights and the other being connected to the vehicle tail or parking lights, each of said moveable contacts being operable to supply power to their respective outputs when the ignition switch is in an ON condition and the starter switch is in an OFF condition.

* * * * *